United States Patent [19]

Coon et al.

[11] 3,708,546
[45] Jan. 2, 1973

[54] PREPARATION OF DINITROTOLUENE

[75] Inventors: Clifford L. Coon, Fremont; Gerald J. McDonald, Menlo Park; Marion E. Hill, Palo Alto, all of Calif.

[73] Assignee: Stanford Research Institute, Menlo Park, Calif.

[22] Filed: Jan. 17, 1972

[21] Appl. No.: 218,505

[52] U.S. Cl. .................................................. 260/645
[51] Int. Cl. ............................................... C07c 79/10
[58] Field of Search ....................................... 260/645

[56] References Cited

OTHER PUBLICATIONS

Urbanski, Chemistry and Technology of Explosives, Vol. I, MacMillan Co., New York, 1964, pp. 265 to 268, 285 to 290, 340 and 341.

*Primary Examiner*—Leland A. Sebastian
*Attorney*—Urban H. Faubion et al.

[57] ABSTRACT

Mixtures of dinitrotoluene isomers containing extremely small amounts of meta isomers are rapidly prepared in quantitative yield by temperatures in the presence of a small amount of water. Total meta isomer content can readily be kept at a level below about 2 percent by weight.

3 Claims, No Drawings

PREPARATION OF DINITROTOLUENE

The invention herein described was made in the course of or under a contract with Picatinny Arsenal, U.S. Army Munitions Command.

BACKGROUND OF THE INVENTION

Dinitrotoluene is of particular utility as an intermediate in the preparation of diisocyanates employed in the manufacture of polyurethane foams and elastomers. The highest quality polyurethane products are prepared using the 2,4-dinitrotoluene isomer as the starting compound, the quality of the polyurethane falling off as the content of the 2,6-dinitrotoluene isomer in the starting material increases. Further, in preparing products of this character every effort is made to exclude the 3,5-,3,4-,2,3- and 2,5-dinitrotoluenes (the so-called "meta" isomers) inasmuch as they contribute to the production of an off-colored, yellowish polyurethane product. A variety of methods are available for separating the 2,6- and the meta isomers from the 2,4-isomer, and all are relatively expensive. Further, the isomers removed in this fashion are much less valuable than the remaining 2,4-isomer.

Accordingly, it is an important object of this invention to provide a method for the production of dinitrotoluene wherein the content of the 2,4- isomer is high while that of the other isomers, and particularly those of a meta character, is extremely low.

A further object is to provide a process of the foregoing character which is highly efficient, is relatively inexpensive to operate, and does not require the costly maintenance of anhydrous conditions in the reaction mixture as nitration takes place. The method disclosed in U. S. Pat. No. 2,934,571 is exemplary of an anhydrous process of this character.

SUMMARY OF THE INVENTION

The present invention is based on the discovery that toluene may be efficiently and rapidly nitrated to a mixture of dinitrotoluene isomers high in the 2,4- isomer and having but a very small content (typically 1 to 2 percent) of meta isomers, the process being one wherein the toluene is reacted with a mixture of nitric and sulfuric acids at subzero temperatures in the presence of a small amount of water.

The process of the present invention is conducted at temperatures below about 0°C, and preferably in a temperature range from about −35° to −5°C, and it has been found that a lowering of the reaction temperature progressively favors the production of dinitrotoluene isomer mixtures of lower total meta isomer content. Thus, in a typical operation (see Example 1 below), the total meta isomer content of a dinitrotoluene reaction product prepared by the method of the present invention is 1.40 percent when the nitration is effected at −35°C, and is 1.76 percent, 1.82 percent, and 2.06 percent at temperatures of −25°C, −15°C, and −5°C, respectively. Above about 0°C the content of meta isomers in the product continues to rise, thereby moving the process into a relatively uneconomic area. On the other hand, at temperatures below about −35°C to −40°C, the reaction mixture tends to become somewhat frozen, and such temperatures therefore constitute a practical lower limit for most operations of this invention.

The reaction by which toluene is nitrated to the dinitrotoluene product is somewhat exothermic in nature. Accordingly, the desired low temperature conditions are best maintained by adding the toluene reactant to the refrigerated nitration mixture made up of nitric and sulfuric acids, together with a small amount of water. This mixture can be maintained at temperatures such as −35°C by the use of a cooling bath made up of solid carbon dioxide dissolved in acetone. Similarly, at −25°C there may be employed a bath of this same character, but with ethylene dichloride being employed as the solvent. For bath temperatures such as about −15°C and above, the desired temperatures can be maintained using a conventional ice-salt system.

The nitration of toluene to dinitrotoluene is carried out in accordance with the present invention by using from about 2 to 10 moles of $HNO_3$ per mole of toluene. This represents an excess of nitric acid ranging from 0 to 500 percent over the stoichiometrically required amount of 2 moles of the nitric acid per mole of toluene. Preferably this excess of $HNO_3$ ranges from about 5 percent to 100 percent. The nitration system, which is made up of nitric acid, sulfuric acid and water, contains from about 5 to 30 percent nitric acid (as $HNO_3$) and from about 64 to 95 percent sulfuric acid (as $H_2SO_4$). The system also contains from about 0 to 7 percent water, it being recognized that water, if not present in one or both of the acids employed to make up the system, is formed in some measure (as a reaction product) as soon as the toluene is admixed with the nitration system. Preferably the water content of the system is about 1 to 6 percent. All the percentages given herein are on a weight basis, and, within the foregoing limits, the various percentages for the nitric acid, sulfuric acid and water will always total 100 percent.

It is found that the reaction of the present invention proceeds at a rapid rate and is complete in a matter of a few seconds, giving essentially quantitative yields. However, in some cases the course of a given preparation may be extended over some appreciable period of time as the toluene is slowly added to the acid nitration mixture to avoid any undue temperature rise. In any event, lengthening the reaction period is not harmful.

The dinitrotoluene product can be recovered from the reaction mixture by solvent extraction. Methylene chloride is an excellent solvent for this purpose, it having very limited water solubility and good solubility for the dinitrotoluene isomers. A solvent of this character can be used either with or without the practice of a step whereby the dinitrotoluene is brought down in solid form (as by pouring the reaction mixture over ice) before being taken up in the solvent. Methylene chloride also has the advantage of a low boiling point which facilitates its being stripped from the residual dinitrotoluene material. The latter can then be further purified, as desired, by water washing either with or without the addition of caustic to remove any traces of acid which may remain.

In view of the foregoing factors relating to the speed and high yield of the reaction, as well as ease of product recovery, it is obvious that the process of this invention is well adapted to be practiced in either a batch or a continuous fashion.

DESCRIPTION OF PREFERRED EMBODIMENTS

The following examples are illustrative of the invention but are not to be construed as limiting.

Example 1

A nitrating mixture is prepared from 280.00 g 96% $H_2SO_4$ and 27.00 g 70% $HNO_3$ (0.300 mole) to give a clear, colorless solution containing by weight 87.56% $H_2SO_4$, 6.16% $HNO_3$, and 6.29% $H_2O$. To the slurry that results when this solution is cooled to −35° there is added 13.10 g of toluene (0.142 mole) over a period of 20 minutes. The mixture is then stirred at −35°C for 1 hour and finally quenched by pouring it onto 250 g of ice. The product is separated by extraction with seven 25 ml portions of methylene chloride. These are combined, dried ($MgSO_4$), and the solvent removed under vacuum to give 25.73 g of dinitrotoluene, yield, 99.5 percent. Analysis of this product by gas liquid phase chromatography showed that it contains 11.13% 2,6-DNT, 0.30% 2,3- and 2,5-DNT, 87.45% 2,4-DNT, and 1.12% 3,4-DNT. Total meta isomers are 1.43 percent.

EXAMPLES 2–5

The operations of these examples are conducted in essentially the same manner as that recited in Example 1 except that here the same nitration mixture (90.6% $H_2SO_4$, 6.3% $HNO_3$, and 3.1% $H_2O$) is used in each example, and there is employed the same mole ratio of $HNO_3$ to toluene (4:1). On the other hand, the reaction temperature is varied from example to example. This is shown in the following table which presents the dinitrotoluene isomer distribution obtained in each of the several examples, the yield in all cases exceeding 99 percent.

TABLE

Temperature Dependence of Isomer Distribution and Setting Point of the Dinitrotoluene Product

| Ex. No. | Reaction Temp,°C | DNT Isomers, % 2,4 | 2,6 | 3,4 | 2,3+2,5 | total meta | Set point,°C |
|---|---|---|---|---|---|---|---|
| 2 | −5 | 84.48 | 13.46 | 1.41 | 0.65 | 2.06 | 61.0 |
| 3 | −15 | 85.34 | 12.83 | 1.29 | 0.53 | 1.82 | 61.8 |
| 4 | −25 | 86.47 | 11.77 | 1.26 | 0.50 | 1.76 | 62.5 |
| 5 | −35 | 88.98 | 9.62 | 1.07 | 0.33 | 1.40 | 63.7 |

It will be seen from the data of the above table that the total content of meta isomers in the product, as well as that of the more desirable 2,4-nitrotoluene isomer, varies with temperature. Thus, the colder temperatures facilitate enhanced production of the 2,4- isomer and formation of smaller total meta isomer contents.

It forms a feature of the nitration process of the present invention that the recovered dinitrotoluene reaction product is free of any detectable amounts of nitrocresol impurities. Thus, tests adapted to show the presence of nitrocresols in amounts somewhat less than 100 ppm in the dinitrotoluenes produced as described above have all been negative.

We claim:

1. A process for nitrating toluene to dinitrotoluene which comprises reacting toluene at temperatures below 0°C with a mixture of nitric acid and sulfuric acid containing a small amount of water.

2. The process of claim 1 wherein the toluene nitration reaction is conducted using about 2 to 10 moles of $HNO_3$ per mole of toluene and wherein the mixture of acids contains 5 to 30 weight percent $HNO_3$, 64 to 95 weight percent $H_2SO_4$, and 0 to 7 weight percent water.

3. The process of claim 2 wherein the nitration reaction is conducted at temperatures of from about −35°C to about −5°C.

* * * * *